Figure 1:
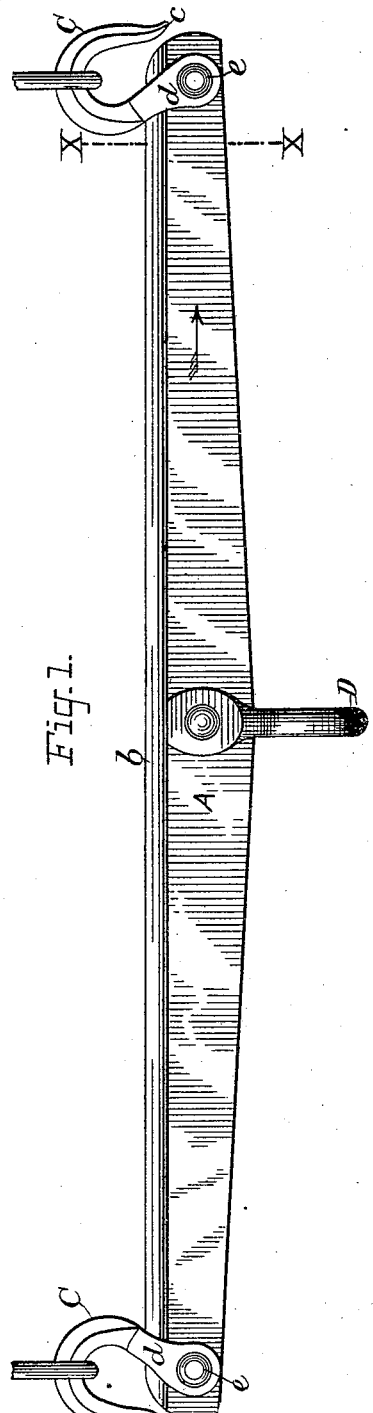

(No Model.)

W. H. HOLSCLAW.
WHIFFLETREE.

No. 473,226. Patented Apr. 19, 1892.

ATTEST:
J. H. Hurdle
M. E. Fisher

INVENTOR:
Wilford H. Holsclaw

By J. N. McIntire
Attorney

THE NORRIS PETERS CO., PHOTO-LITHO., WASHINGTON, D. C.

UNITED STATES PATENT OFFICE.

WILFORD H. HOLSCLAW, OF LOUISVILLE, KENTUCKY, ASSIGNOR TO B. F. AVERY & SONS, OF SAME PLACE.

WHIFFLETREE.

SPECIFICATION forming part of Letters Patent No. 473,226, dated April 19, 1892.

Application filed December 24, 1891. Serial No. 416,041. (No model.)

*To all whom it may concern:*

Be it known that I, WILFORD H. HOLSCLAW, of Louisville, in the county of Jefferson and State of Kentucky, have invented a certain new and useful Improvement in Whiffletrees; and I do hereby declare that the following is a full, clear, and exact description of the same, reference being had to the accompanying drawings, forming part of this specification.

My invention relates to that type or kind of whiffletree (either single or double) which is made of metal, and that is known, commonly, in the market and to the manufacturer as a "steel tree," because made, usually, of steel, so as to combine in the most eminent degree great strength and durability with comparative lightness.

Previous to my invention metallic or "steel" whiffletrees have been made of various forms and constructed sometimes of a single bar (of one or another shape) and sometimes in the form of some sort of truss or of a frame-like pattern, and in the various forms of metallic tree different sorts of devices have been used for the coupling of the rear ends of the traces or trace-chains to the ends of the tree.

My invention relates to that class of steel tree which is composed of a single piece or bar of metal, and more especially to that species of this class of trees in which the tree or bar is composed of a sort of angle-iron which is about T-shaped in cross-section, that (flange-like) portion of the bar which corresponds to the top of the "T" constituting the front edge or side of the whiffletree. This form of steel tree, while possessing great combined strength, rigidity, and lightness, presents, as is well known, a forward or front edge composed of curved surfaces, which, like the curved or rounded wooden tree, (in cross-section,) is not liable to inflict any injury or cause any discomfort to the draft-animal in the event of the whiffletree accidentally coming into sudden and forcible contact with the hind legs of the latter.

My invention has for its object to provide for use a steel tree of the species alluded to which shall possess in an eminent degree the combined qualities of strength, lightness, durability, efficiency in action, and non-liability of any casual or accidental detachment from its hooks of the trace-rings coupled therewith; and to this end and object my invention consists in the novel combination of devices, which will be found hereinafter fully described, and which will be more particularly pointed out in the claim of this specification.

To enable those skilled in the art to which my invention appertains to make and use steel trees according to the same, I will now proceed to fully describe my novel construction of tree, referring by letters to the accompanying drawings, which form part of this specification, and in which I have illustrated my invention carried into effect in the precise form in which I have so far successfully practiced it.

Figure 2:
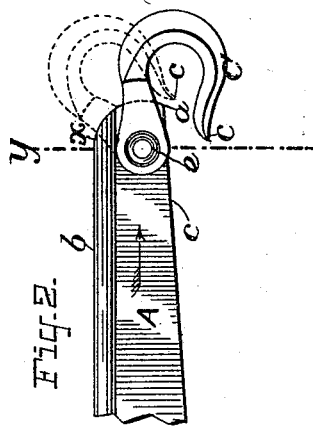
Figure 3:
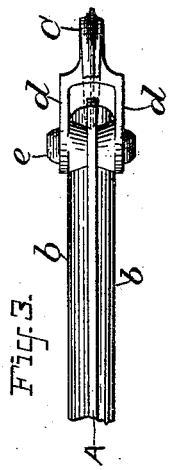
Figure 4:
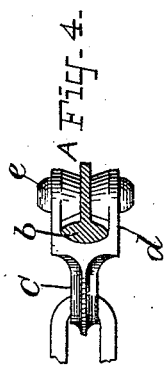
Figure 5:
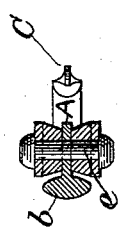

In the drawings, Figure 1 is a top view of one of my improved steel trees, assuming the tree to be in about the position it would assume when coupled by its center ring to some implement or vehicle to be drawn along and when under draft-strain exerted by the traces coupled to its trace-hooks. Fig. 2 is a similar view, but showing only one end portion of the tree and exhibiting the trace-hook turned back into a position such as to permit the uncoupling therefrom by hand of the trace-ring. Fig. 3 is a rear edge view of the parts seen in top view at Fig. 2. Fig. 4 is a cross-section at the line $x\ x$ of Fig. 1, looking in the direction indicated by the arrow. Fig. 5 is a cross-section at the line $y\ y$ of Fig. 2, looking in the direction indicated by the arrow therein.

In the several figures the same part will be found designated always by the same letter of reference.

The whiffletree or bar proper is composed, as shown, of steel or angle-iron which is T-shaped in cross-section and having its plate-like portion A widest at the middle of the tree and narrowed toward each end, as clearly illustrated in Fig. 1, while its forward portion or front rib $b$ is preferably of the same width throughout its entire length. The proportionate sizes of the two portions A and $b$ should of course be such as to suit the requirements of a metallic tree of a given size designed for any special class of work and may be varied more or less from what I have shown, if deemed expedient.

In the tree shown in the drawings the extreme length is two feet, the width of the plate-like portion A being about an inch and a half at the middle of the tree, tapered off to about seven-eighths of an inch at each end, and the thickness of part A about one-eighth of an inch, while the front rib-like portion $b$, which is about the same width throughout its length, is about seven-eighths of an inch wide and of a thickness of about five-sixteenths of an inch at its center line, tapered off to a less thickness toward its rounded upper and lower edges, as clearly shown at Fig. 4.

D is the center ring, by means of which the tree may be coupled to the implement or vehicle to which draft-power is to be applied, and which center ring may be either riveted rigidly to the part A of the tree at its middle point, (lengthwise,) or may be pivotally connected therewith in any manner deemed best to the manufacturer.

C C are the trace-hooks, one of which is pivotally combined with the tree near each of its ends, and as these hooks are duplicates, and each is arranged and operates like the other, a description of the construction and operation of one will serve for both of them.

The hook part proper or the trace-ring-engaging portion of hook C is about the contour or pattern shown, and should of course be fashioned so as to possess the requisite strength, though its precise form is not material to my invention. It is, however, essential or important, in order to get perfection of action and a proper distribution of the draft-strain on the pivotal point of connection to the tree and on the tree itself, that the root or base portion of the hook be bifurcated, as shown, so that its two arm-like parts $d\,d$ will straddle or yoke around the end portion of the part $b$ of the tree, and to maintain the perforated ends of the arms $d\,d$ in the proper relationship to both the parts $b$ and A of the tree these arms are preferably cast or formed with inwardly-projecting hub-like portions, as clearly shown, that so nearly approach each other as to leave just space enough between them for the plate-like portion A of the tree. This portion A, and likewise the arms $d\,d$, are perforated for the accommodation of a pintle or pin $e$, which in the case shown has a head on one end and which in assembling the parts of the whiffletree has its body passed through the holes in the said arms and the aperture in the portion A of the tree, when its point or headless end is upset or riveted, as shown, all in such manner that the doubly-armed hook and its riveted-in pintle $e$ will be free to turn (to a limited extent, as will be presently explained) round about the axis of the pintle $e$, the latter turning freely within the hole in the part A.

The end of the tree is curved in substantially the arc of a circle struck from a point which resides in the axis of the pintle $e$, so that the trace-hook C in turning on its axis of motion will have its extreme point $c$ move in an arc about concentric with that of the said curved end of the tree, (see Figs. 1 and 2,) and the location of this point or end $c$ of the hook is such relatively to the said curved end of the tree that when the hook shall be in any position, except that shown in full lines at Fig. 2, the intervening space between point $c$ and the said curved end of the tree shall be too small to possibly permit the passage between said parts of any trace-ring that may have been coupled for draft purposes with the trace-hook. This relationship between the end $c$ of the trace-hook and the said curved end portion ($a$ to $x$, Fig. 2) of the tree that thus prevents any coupling or uncoupling of the hook and a trace-ring exists, as will be understood by reference to Fig. 2, with the trace-hook in any position, except that into which the hook has to be turned by hand, (by relieving it of all draft strain and even the gravity of the tree,) and by observation of the parts as seen at Fig. 1 and also as shown by both full lines and dotted lines at Fig. 2 it will be understood that the trace-hook in being turned backward has its point $c$ travel concentrically with the curved-tree end clear around to the point $a$, so that only after having passed this point does the end of the hook begin to separate more widely from the plate-like portion A of the tree, assuming a position that will permit the coupling with or uncoupling from it of a trace-ring only when it shall have been turned nearly or quite into the position seen in full lines at Fig. 2.

It will be seen that in the tree made and operating as herein shown and described not only are all the usual advantages (as to strength, cheapness, and efficiency with reference to the body portion) of an angle-iron steel tree attained to, but that, furthermore, with the use, in combination with the metallic bar, of plain and simply-pivoted trace-hooks a whiffletree is afforded for use which has perfect and easily-managed safety trace-hooks from which the trace-rings cannot possibly become detached casually.

Having now so fully explained the construction and operation of my improved safety steel tree that any one skilled in the art can make and any one possessing ordinary intelligence can use whiffletrees made according to my invention, what I claim as new, and desire to secure by Letters Patent, is—

In a metallic whiffletree, the combination, with a bar comprising a plate-like portion and a laterally-enlarged or rib-like front edge, of pivotally-connected trace-hooks, the hinge-like portions of which are shaped, substantially as described, to embrace but turn clear of the said rib-like front edge of the bar and the points of which hooks are adapted to be moved and lie in close proximity to the front portion and ends of the bar, but may be moved sufficiently far away from the rear edge portion of the bar when turned clear back to permit the easy removal of the trace-rings, all substantially in the manner hereinbefore set forth.

In witness whereof I have hereunto set my hand this 30th day of November, 1891.

WILFORD H. HOLSCLAW.

In presence of—
    WALTON ERRINGTON,
    ADOLPH G. RENAN.